United States Patent
Wnuk

(10) Patent No.: US 9,172,543 B2
(45) Date of Patent: Oct. 27, 2015

(54) DETERMINING CRL SIZE IN VIEW OF SYSTEM CAPABILITY

(75) Inventor: Andrew Wnuk, San Jose, CA (US)

(73) Assignee: Red Hat, Inc., Raleigh, NC (US)

(*) Notice: Subject to any disclaimer, the term of this patent is extended or adjusted under 35 U.S.C. 154(b) by 635 days.

(21) Appl. No.: 12/713,706

(22) Filed: Feb. 26, 2010

(65) Prior Publication Data

US 2011/0213964 A1   Sep. 1, 2011

(51) Int. Cl.
H04L 29/06 (2006.01)
H04L 9/32 (2006.01)
H04L 29/08 (2006.01)

(52) U.S. Cl.
CPC .......... H04L 9/3268 (2013.01); H04L 67/2842 (2013.01)

(58) Field of Classification Search
CPC .......................... H04L 67/2842; H04L 9/3268
USPC .................................................. 713/155–158
See application file for complete search history.

(56) References Cited

U.S. PATENT DOCUMENTS

2002/0099668 A1* 7/2002 Perlman .......................... 705/76
2002/0107814 A1* 8/2002 Micali ............................. 705/67
2003/0074161 A1* 4/2003 Smocha et al. ............... 702/186
2003/0236976 A1* 12/2003 Wheeler ........................ 713/158
2010/0146250 A1* 6/2010 Bergerson et al. ................ 713/1

OTHER PUBLICATIONS

"Red Hat Certificate System 7.3 Administration Guide," Red Hat, May 2007, 84 pages.*
Lee et al., Parameter Decision Methods of Server's Capacity for Aperiodic Tasks in Real-Time Systems, CCSC Journal, vol. 7, No. 3, 1991, 11 pages.*
Allspaw, J., "Chapter Three: Measurement: Units of Capacity," The Art of Capacity Planning, O'Reilly Media Inc., 2008, 12 pages.*
Mosberger et al., "httperf: A Tool for Measuring Web Server Performance," Hewlett-Packard Labs, 1998, 12 pages.*
Bicakci et al., How to Incorporate Revocation Status Information into the Trust Metrics for Public-Key Certificate, Mar. 2005.*
Solis et al., Simple and Flexible Revocation Checking with Privacy, Jun. 2006.*

* cited by examiner

*Primary Examiner* — Chau Le
(74) *Attorney, Agent, or Firm* — Lowenstein Sandler LLP

(57) ABSTRACT

A certificate revocation list (CRL) deployment system loads a portion of test data that represents revoked certificates into a cache at periodic intervals and generates a CRL for a corresponding periodic interval using the test data that is loaded in the cache at that corresponding periodic interval. The CRL deployment system determines a CRL size that the server computing system is capable to support using the generated CRLs and notifies a user of the CRL size that the server computing system is capable to support.

20 Claims, 3 Drawing Sheets

DETERMINING CRL SIZE IN VIEW OF SYSTEM CAPABILITY

TECHNICAL FIELD

Embodiments of the present invention relate to certificate revocation lists. Specifically, the embodiments of the present invention relate to automatically determining an acceptable size of a certificate revocation list (CRL).

BACKGROUND

A certificate system provides a security framework to ensure that network resources are accessed by authorized users. The certificate system is capable of generating digital certificates for different users to verify the identity of a presenter. The certificate system can include a Certificate Authority (CA) subsystem to issue and revoke certificates. Revoked certificates are certificates that are no longer valid and should no longer be relied upon. A certificate revocation list (CRL) is a list of the revoked certificates.

Prior to installation of the CA servers, a system administrator can determine the number of CA servers to deploy for a certificate system. Typically, a system administrator can estimate a relationship between the number of certificates issued by a CA server and the number of certificates that are revoked by the CA server. For example, a system administrator may estimate that a CA server may revoke ten percent of the issued certificates. A system administrator can use this relationship to determine the number of CA servers for deployment. For example, a system administrator may determine that the size of a CRL for a CA server is 2.5 million revoked certificates and thus, the CA server is capable of issuing up to 25 million certificates. If the system administrator needs to build a certificate system capable of issuing 100 million certificates, the system administrator can deploy four CA servers.

The generation of a CRL consumes much of a CA server's resources. Once a system administrator can confirm the size of a CRL for a CA server, the system administrator can have confidence that a CA server can issue and revoke certificates based on the size of the CRL. Therefore, a system administrator, typically, first determines the size of a CRL for a CA server. The system administrator can determine the size of a CRL for a CA server by manually simulating real world application of a CA server. For example, a system administrator can take up to one week to generate 50 million certificates on a CA server and attempt to generate a CRL. The generated CRL may include 3 million certificates. The system administrator can use the user-defined relationship, such as ten percent, to determine that this CA server, which can support a CRL of up to 3 million revoked certificates, can issue up to 30 million certificates. If the system administrator needs a configuration to support 100 million certificates, the system administrator can plan to deploy at least four CA servers. Planning for deployment, however, may be an arduous and time-consuming process. System administrators may not have the resources for such a manual deployment planning process.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for automatically determining an acceptable size of a certificate revocation list (CRL) for a system based on the capability of the system. A CRL deployment system loads a portion of test data that represents revoked certificates into a cache at periodic intervals and generates a CRL for a corresponding periodic interval using the test data that is loaded in the cache at that corresponding periodic interval. The CRL deployment system determines a CRL size that the server computing system is capable to support using the generated CRLs and notifies a user of the CRL size that the server computing system is capable to support.

Embodiments of the present invention can emulate up to millions of revoked certificates in a system without burdening system resources or engaging system administrators with a time consuming process. Embodiments of the present invention can store test data representing a number of revoked certificates and can automatically determine an acceptable size of a CRL for a system using the test data.

Figure 1:
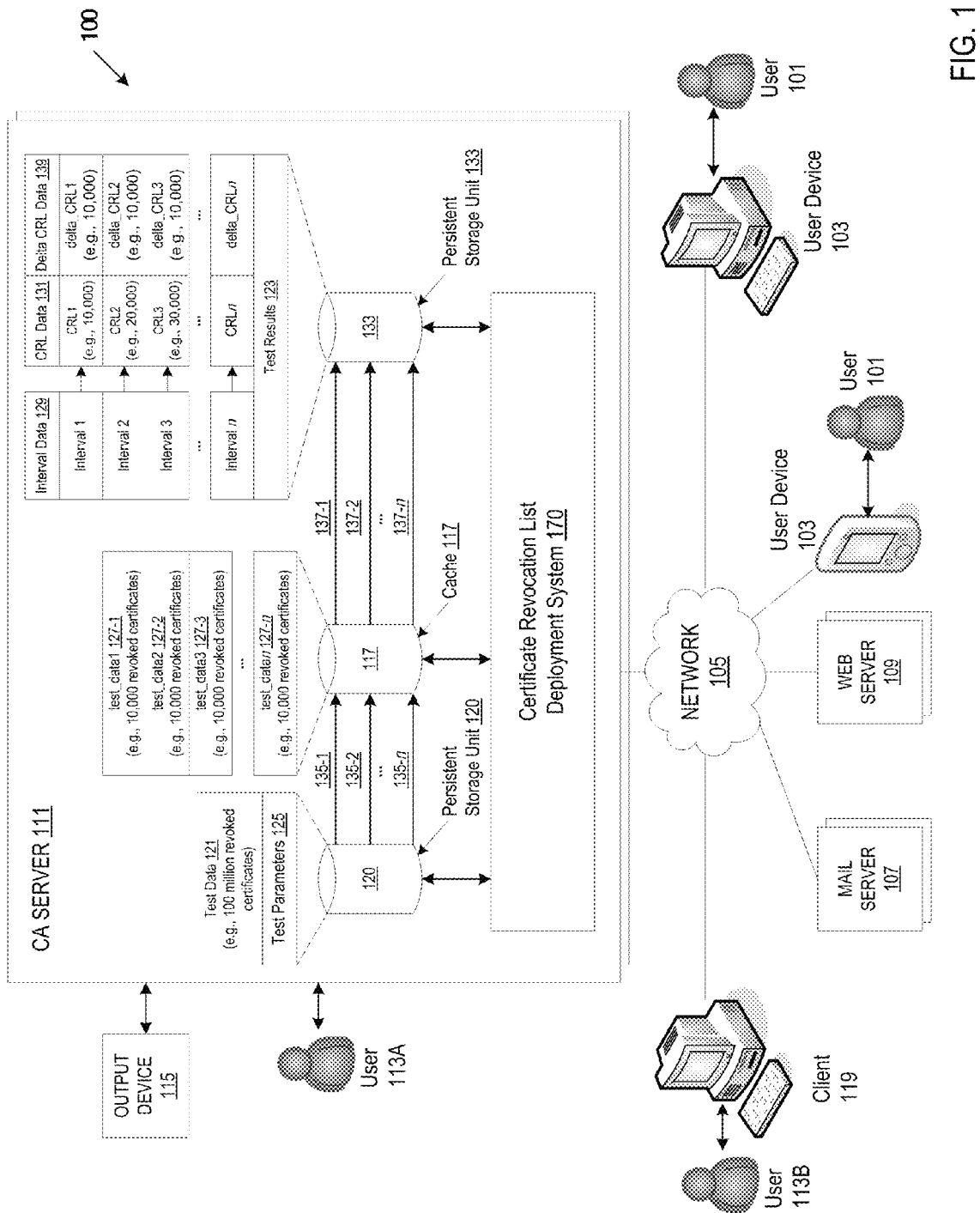
FIG. 1 illustrates an exemplary network architecture in which embodiments of the present invention may operate.

FIG. 1 illustrates an exemplary network architecture 100 on which embodiments of the present invention can be implemented. The network architecture 100 can include one or more systems configured as Certificate Authority (CA) servers 111 for managing the issuance and revocation of digital certificates for use by other parties, such as a user 101 or a server 107,109.

In one embodiment, a CA server 111 can be a prototype CA server. A prototype CA server is a server that is configured as a CA, but not yet operational in real world application. As a prototype server, the CA server 111 may be operating in a test environment and may not yet be coupled to a network 105 for deployment. In another embodiment, a CA server 111 can be a production CA server in a production environment coupled to a network 105. A production CA server is a CA server operating for real world application. A system administrator 113A,B can configure a CA server 111 (e.g., a prototype CA server or a production CA server) with a certificate revocation list deployment system 170.

The network architecture 100 can include one or more servers, such as mail servers 107 and web servers 109. The servers 107,109 can send a request over network 105 to a CA server 111 for a certificate to be issued. A user 101 can use a client device 103 to also send a request over network 105 to a CA server 111 for a certificate to be issued. When a CA server 111 is deployed and not running in test mode, the CA server 111 can receive the request, and can issue a certificate and manage the status of the certificate. A CA server 111 can maintain status data for the status of an issued certificate in an internal database. The internal database may be stored in persistent storage unit 133. A persistent storage unit can be a local storage unit or a remote storage unit. Persistent storage units can be a magnetic storage unit, optical storage unit, solid state storage unit or similar storage unit. Persistent storage units can be a monolithic device or a distributed set of devices. A 'set,' as used herein, refers to any positive whole number of items.

A CA server 111 can receive a revocation request to revoke a certificate from an end user (e.g., the original owner of a certificate) or by a certificate manager agent. The CA server 111 can update the status data for the certificate it its internal database in a persistent storage unit 133. The CA server 111 can use the entries in the internal database to track all of the revoked certificates.

One method for conveying the revocation status of certificates is by a CA server 111 generating and publishing a list of revoked certificates, known as a certificate revocation list (CRL). A CRL is a publicly available list of certificates that have been revoked. The CA server 111 can be configured to generate and publish CRLs. When configured, the CA server 111 can generate a CRL and can make the CRL public by publishing it to a central repository to notify other users that the certificates in the CRL are no longer valid.

Prior to installation of the CA servers, a system administrator 113A,B can determine the number of CA servers to deploy for a certificate system. A system administrator may determine a size of a CRL that a CA server may be able to support and use the CRL size in determining the number of CA servers to deploy.

A CA server 111 can include a CRL deployment system 170 for automatically determining a size of a CRL that a CA server 111 can support based on the capability of the CA server 111. The size of the CRL that a CA server 111 can support may be referred to as an acceptable CRL size as used herein. Once a system administrator 113A,B determines the acceptable CRL size for a CA server 111, the system administrator 113A,B can use the acceptable CRL size to determine the number of CA servers to deploy.

The CA server 111 can store test data 121 in a persistent storage unit 120. Test data 121 can include data that represents revoked certificates. For example, the test data 121 can include data that represents 100 million revoked certificates. The test data can include entries for revoked certificates that have, for example, a serial number, a revocation date, a description of a reason for revoking the certificate, and an invalidity period.

The CRL deployment system 170 can automatically load a portion of the test data 121 from the persistent storage unit 120 to the cache 117 at intervals to emulate that a CA server 111 is issuing and revoking certificates without engaging system administrators with a manual and time consuming process. The test data 121 can be loaded into the cache 117 based on test parameters 125. The test parameters 125 can include parameters that define the portion of test data 121 to be loaded into the cache 117 for an interval. For example, the portion of test data 121 to be loaded into the cache 117 at an interval can be data that represents a fixed number of revoked certificates, such as 10,000 revoked certificates. In another example, the portion of test data 121 to be loaded into the cache 117 at an interval can be data that represents a random number of revoked certificates.

The test parameters 125 can also include parameters that define the test completion. The completion parameters can be configured such that the testing completes upon the CRL deployment system 170 detecting that a CRL failed to be generated or upon the CRL deployment system 170 detecting that a target CRL size has been reached. The completion parameters can include a target CRL size.

The test parameters 125 can be user-defined test parameters. For example, a system administrator can configure the test parameters for loading 10,000 revoked certificates into the cache 117 per interval and to complete the testing when the CRL deployment system 170 fails to generate a CRL. The deployment system 170 can generate and present a test user interface for receiving user input for configuring the test parameters 125. The test parameters 125 can be stored in persistent storage unit 120. The persistent storage unit 133 and the persistent storage unit 120 can be the same persistent storage unit or separate persistent storage units.

The CRL deployment system 170 can attempt to generate a CRL at each interval using the test data 127 that is loaded into the cache 117 at that particular interval. For example, at interval 1, the CRL deployment system 170 can load (135-1) a portion of the test data 121 that represents 10,000 revoked certificates into the cache 117, such as test_data1 (127-1). At interval 1, the CRL deployment system 170 can use the test_data1 (127-1) that is loaded in the cache 117 to automatically generate (137-1) a CRL, such as CRL1. The CRL deployment system 170 can store a generated CRL in an internal database in persistent storage unit 133.

The CRL system 170 can attempt to generate a full CRL (e.g., CRL1 to CRLn) and/or a delta CRL (e.g., delta CRL1 to delta CRLn) for an interval. A full CRL can contain a record of all of the revoked certificates since the cache 117 began collecting the test data (e.g., test_data 127-1 to 127-*n*) until the cache 117 is cleared. For example, at interval 1, the cache 117 is loaded with test_data1 (127-1) and the CRL deployment system 170 can use test_data1 (127-1) to generate a full CRL1. The full CRL1 can include a list of serial numbers for the 10,000 revoked certificates in test_data1 (127-1). At interval 2, the cache 117 is loaded with both test_data1 (127-1) and test_data2 (127-2) and the system 170 can use this test data at interval 2 to generate a full CRL2. The full CRL2 can include a list of serial numbers for the 2000 revoked certificates in test_data1 (127-1) and test_data2 (127-2).

A delta CRL can contain a record of all of the revoked certificates since the last CRL (full or delta) was generated. For example, at interval 3, the cache 177 is loaded with test_data1 (127-1), test_data2 (127-2), and test_data3 (127-3). The system 170 may identify that the last CRL that was generated was full CRL2 and the system 170 can attempt to generate a delta CRL using data that was loaded into the cache 117 since the full CRL2 was generated (i.e., test_data3). The delta CRL3 can include the serial numbers for the 10,000 revoked certificates in test_data3 (127-3).

The CRL deployment system 170 can continue to automatically and periodically load additional portions of test data 121 into the cache 117 and attempt to generate a CRL for an interval until the test completion parameters are satisfied, such as until the deployment system 170 reaches a target CRL size or fails to generate a CRL.

The deployment system 170 can determine a target CRL size is reached by comparing the size of the most recently generated full CRL (or the sum of all of the delta CRLs) to a test parameter that defines the target CRL size. The deployment system 170 can determine a CRL was not successfully generated by detecting a system error message. The error message may be generated by a processor on the CA server 111.

For example, the CRL deployment system 170 can load (135-2) another 10,000 revoked certificates, such as test_data2 (127-2), to the cache 117 for interval 2. For interval 2, the CRL deployment system 170 can attempt to generate (137-2) a second CRL, such as CRL2, using the cumulative test data that is loaded in the cache 117 at interval 2 (e.g., test_data1 and test_data2). The CRL deployment system 170 may continue to automatically load additional portions of the test data 121 to the cache 117 for 7,50 intervals (e.g., where interval n is interval 750). For each interval, the CRL deployment system 170 may successfully generate a full CRL. CRLn may be a full CRL that includes a list of 7.5 million serial numbers for revoked certificates. At a next interval, such as interval 751, the system 170 may add another 10,000 revoked certificates to the cache 117 and may attempt to generate a full CRL for interval 751. The system 170 may receive a system error message that an attempt to generate a full CRL for interval 751 has failed and the CRL deployment system 170 may automatically stop adding portions of the test data 121 to the cache 117.

When the deployment system 170 stops to add test data 121 to the cache 117 (e.g., when the deployment system 170 fails to generate a CRL or when the target CRL size is reached), the deployment system 170 can determine an acceptable CRL size for the CA server 111 by examining the number of certificates (or number of serial numbers) listed in the most recently generated full CRL or listed in all of the delta CRLs added together.

In one embodiment, the internal database stores only the latest full CRL and delta CRL, such as CRLn and delta_CRLn. In this embodiment, where a CRL deployment system 170 stores only the latest full CRL and delta CRL, the system 170 can determine the accetpable CRL size from the latest full CRL. For example, where the system 170 added portions of test data 121 to the cache 117 for 750 intervals (e.g., where interval n is interval 750), the system 170 can determine that CRLn has 7.5 million serial numbers for revoked certificates. The acceptable CRL size for the CA server 111 is 7.5 million revoked certificates.

In another embodiment, the internal database stores all of the generated CRLs, such as full CRLs 1 to n and delta CRLs 1 to n. In this embodiment, the system 170 can determine an acceptable CRL size from the sum of the delta CRLs. For example, the system 170 may have added portions of test data 121 to the cache 117 for 750 intervals (e.g., where interval n is interval 750), resulting in delta CRL 1 to delta CRL 750. Each delta CRL may include a list of 10,000 revoked certificates. The system 170 can determine the total number of revoked certificates is 7.5 million serial numbers using all of the delta CRLs. The acceptable CRL size for the CA server 111 is 7.5 million revoked certificates.

A system administrator 113A,B can use a relationship between the acceptable CRL size and total number of issued certificates to determine the number of certificates the CA server 111 can issue. The relationship can be user-defined. For example, the system administrator 113A,B may define the relationship as the acceptable CRL size will represent ten percent of the total number of issued certificates. Therefore, the CA server 111 can issue up to 75 million certificates. If the system administrator 113A,B is planning for a certificate system that should be capable to issue 100 million certificates, the system administrator 113A,B may decide to deploy at least two CA servers.

The deployment system 170 can store test results 123 in a persistent storage unit 133. Examples of test results 123 can include the size of a CRL, the acceptable CRL size for the CA server, the number of successful intervals, data indicating that an attempt to generate a CRL has failed, data indicating that a target CRL size has been reached, etc. The deployment system 170 can generate and present a test user interface for displaying the test results 123. For example, the deployment system 170 can display an error message indicating an attempt to generate a CRL has failed. The system 170 can also display the acceptable CRL size for the CA server 111. The deployment system 170 can present the user interface in an output device 115 (e.g., a display device, a printer, etc.) coupled to the CA server 111 or over the network 105 on a client device 119.

The persistent storage unit 133 can store interval data 129, CRL data 131, and delta CRL data 139 for the generated CRLs. Interval data 129 can include an interval identifier. CRL data 131 can include an identifier that associates a full CRL with an interval. Delta CRL data 139 can include an identifier that associates a delta CRL with an interval. The delta CRL data 139 can also include data that associates the delta CRL with a full CRL. The interval data 129, CRL data 131, and delta CRL data 139 can be stored in an internal database.

A CA server 111, mail server 107, and web server 109 can be any type of computing device including server computers, desktop computers, laptop computers, hand-held computers, or similar computing device. A client device 119 and user device 103 can be a smart hand-held device or any type of computing device including desktop computers, laptop computers, mobile communications devices, cell phones, smart phones, hand-held computers or similar computing device capable of transmitting certificate requests and receiving certificates. The network 105 can be a wide area network (WAN), such as the Internet, a local area network (LAN), such as an intranet within a company, a wireless network, a mobile communications network, or a similar communication system. The network 105 can include any number of networking and computing devices such as wired and wireless devices.

The CRL deployment system 170 can be implemented as hardware, computer-implemented software, firmware or a combination thereof. In one embodiment, the CRL deployment system 170 comprises instructions stored in memory 304 that cause a processing device 302 in FIG. 3 described in greater detail below to perform the functions of the CRL deployment system 170.

Figure 2:
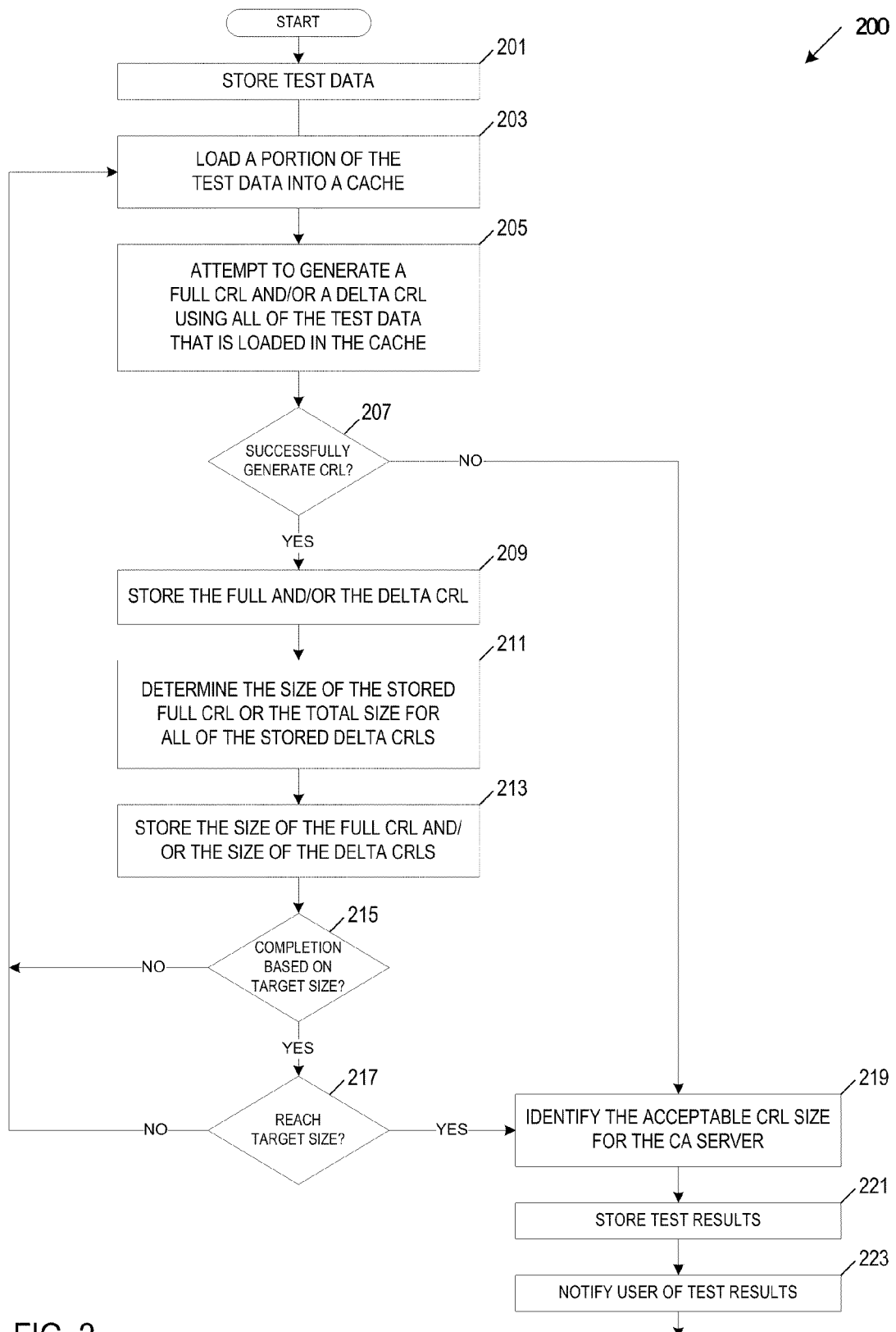
FIG. 2 is a flow diagram which illustrates an embodiment of a method for automatically determining an acceptable size of a certificate revocation list (CRL) for a system based on the capability of the system.

FIG. 2 is a flow diagram which illustrates an embodiment of a method 200 for automatically determining an acceptable size of a certificate revocation list (CRL) for a system based on the capability of the system. Method 200 can be performed by processing logic that can comprise hardware (e.g., circuitry, dedicated logic, programmable logic, microcode, etc.), software (e.g., instructions run on a processing device), or a combination thereof. In one embodiment, method 200 is performed by the certificate revocation list (CRL) deployment system 170 in a server 111 of FIG. 1.

In one embodiment, the method 200 can be initiated upon the CRL deployment system storing test data, which represents a number of revoked certificates, in a persistent storage unit at block 201. For example, the test data can represent 100 million revoked certificates. The test data can include entries for revoked certificates that have, for example, a serial number, a revocation date, a description of a reason for revoking the certificate, and an invalidity period.

In another embodiment, the method 200 can be initiated upon the CRL deployment system loading a portion of the test data into a cache at block 203. The deployment system can load a portion of the test data into the cache at periodic intervals. The deployment system can store test parameters that define the portion of test data to be loaded into the cache and that define completion parameters for completing the testing. The completion parameters can be configured such that the testing completes upon the CRL deployment system detecting that a CRL failed to be generated or upon the CRL deployment system detecting that a target CRL size has been reached. The completion parameters can include a target CRL size. The test parameters can be user-defined test parameters. For example, a system administrator can configure the CRL deployment system to load a random number of certificates into the cache for each interval. In another example, a system administrator can configure the test parameters for loading test data that represents a fixed number (e.g., 10,000) of revoked certificates per interval and to complete the testing when the CRL deployment system fails to generate a CRL. In this example, the CRL deployment system loads 10,000 revoked certificates into the cache at block 203.

At block 205, the deployment system attempts to generate a certificate revocation list using the test data that is loaded in the cache. Using the example above, the CRL deployment systems loads 10,000 revoked certificates into the cache at block 203 for a first interval, and the deployment system attempts to generate a CRL using the 10,000 revoked certificates that were loaded into the cache for the first interval. In another example, the deployment system loads 10,000 revoked certificates into the cache for each interval and loads test data into the cache for 800 intervals. At the end of interval 800, the deployment system can attempt to generate a CRL using 8 million revoked certificates, which is the test data that was loaded into the cache for the 800 intervals. The deployment system can attempt to generate a full CRL and/or a delta CRL. A full CRL can contain a record of all of the revoked certificates since test data was first loaded into the cache until the cache is cleared. A delta CRL can contain all of the revoked certificate information since the last CRL (full or delta) was generated.

At block 207, the deployment system determines whether a certificate revocation list (e.g., full CRL, delta CRL) was successfully generated. The generation of a certificate revocation list can consume much of a system's resources and an attempt to generate a certificate revocation list may fail. A failed attempt can indicate that a CA server has reached a maximum capability for generating a CRL. The deployment system can determine that a CRL was not successfully generated by detecting a system error message. The error message may be generated by a processor on the CA server.

If the certificate revocation list is not successfully generated (block 207), the method continues to block 219. If the certificate revocation list is successfully generated (block 207), the deployment system can store the certificate revocation list (e.g., the full CRL and/or the delta CRL) at block 209. The deployment system can store the certificate revocation list in a persistent storage unit, for example, in an internal database in the persistent storage unit. In one embodiment, the internal database stores only the latest full CRL and delta CRL. As a new CRL is generated, the old CRL is replaced with the new CRL. In another embodiment, the internal database stores all of the generated full CRLs and delta CRLs.

At block 211, the CRL deployment system determines the size of latest full CRL that is stored in the internal database. The CRL deployment system can examine the number of revoked certificates represented in a CRL to determine the size of a CRL. For example, where the system loads 10,000 revoked certificates into the cache for 800 intervals, the latest full CRL may have 8 million serial numbers and the CRL deployment system determines that the size of the full CRL is 8 million revoked certificates. In an embodiment, where the deployment system stores all of the delta CRLs, the CRL deployment determines the sum of the sizes for all of the delta CRLs at block 211. For example, the system may have loaded 10,000 revoked certificates into the cache for 800 intervals, resulting in 800 delta CRLs stored in an internal database. Each delta CRL may include a list of 10,000 revoked certificates. The system can determine the size for all of the delta CRLs is 8 million. At block 213, the CRL deployment system stores the size of the full CRL and/or the size for all of the delta CRLs in a persistent storage unit.

At block 215, the CRL deployment system determines whether the testing is configured to be completed based on a target CRL size. The testing may be completed based on the success of the CRL deployment system attempting to generate a CRL or based on whether a target CRL size is reached before the CRL deployment system fails to generate a CRL. If the test completion is not based on a target CRL size (block 215), the method returns to block 203 to load another portion of the test data into the cache for a next interval (e.g., interval 801).

If the test completion is based on a target CRL size (block 215), the CRL deployment system determines whether the target CRL size has been reached at block 217. The deployment system can examine the test parameters for a target CRL size. For example, a system administrator may define a target CRL size of 10 million revoked certificates. The deployment system can compare the size of the stored full CRL or the total sum for all of the stored delta CRLs to the target size. For example, the deployment system can compare the size of the most recently generated full CRL, which is 8 million revoked certificates, to the target CRL size of 10 million revoked certificates. If the target CRL size is reached (block 217), the method continues to block 219.

If the target CRL size is not reached (block 217), the CRL deployment system returns to block 203 to load another portion of test data into the cache for a next interval. For example, the deployment system can load another portion of test data that represents 10,000 revoked certificates into the cache for interval 801 at block 203. At block 205, the system makes another attempt to generate a CRL (e.g., a full CRL and/or delta CRL) using the cumulative test data that is loaded in the cache at interval 801. At block 207, if the certificate revocation list is not successfully generated, the deployment system continues to block 219.

At block 219, in one embodiment, the CRL deployment system identifies the size of the latest full CRL that is stored in the internal database as the acceptable CRL size for the CA server. For example, the deployment system may identify that the last generated full CRL is a list having 8 million revoked certificates. The acceptable CRL size for the CA server is 8 million revoked certificates. In another embodiment, the CRL deployment system identifies the size for all of the delta CRLs as the acceptable CRL size for the CA server. For example, the deployment system may identify that the total number of revoked certificates from all of the delta CRLs is 8 million. The acceptable CRL size for the CA server is 8 million revoked certificates.

At block 221, the deployment system can store test results in a persistent storage unit. Examples of test results can include the size of a CRL, the acceptable CRL size for a CA server, the number of successful intervals, an error message indicating an attempt to generate a CRL has failed, a message indicating that a target CRL size has been reached, etc. At block 223, the CRL deployment system notifies a user of the test results. The notification can indicate that the attempt to generate a full CRL and/or delta CRL has failed and/or that a target CRL size has been reached. The notification can include the acceptable CRL size. The deployment system can generate and display the notification in a user interface. The CRL deployment system may further receive user input to clear the cache and the CRL deployment system may clear the cache.

A user, such as a system administrator, can use the acceptable CRL size to determine a number of CA servers to deploy in a certificate system. The system administrator can use a user-defined relationship to determine the number of CA servers to deploy. For example, the user-defined relationship can define the acceptable CRL size will represent ten percent of the total number of issued certificates. The system administrator may have notification that a CA server has an acceptable CRL size of 8 million revoked certificates. The system administrator can estimate that the 8 million revoked certificates will represent ten percent of the total number of certificate the CA server can issue, which can result in the CA server being able to issue up to 80 million certificates. If the system administrator needs a configuration that supports 100 million certificates, the system administrator can plan to deploy at least two CA servers.

Figure 3:
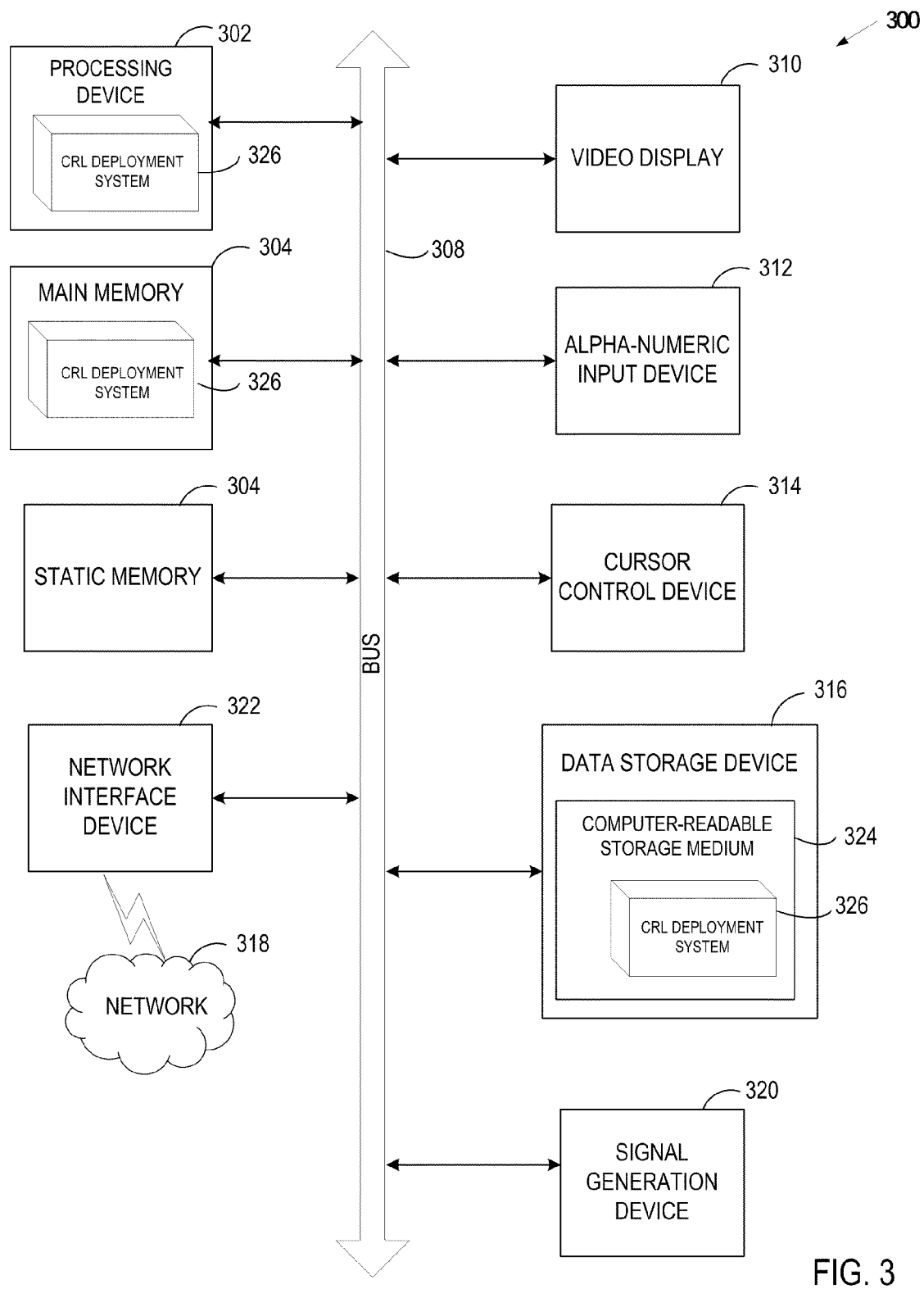
FIG. 3 is a diagram of one embodiment of the CRL deployment system.

FIG. 3 is a diagram of one embodiment of a computer system for for automatically determining an acceptable size of a certificate revocation list (CRL) for a system based on the capability of the system. Within the computer system 300 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 300 includes a processing device 302, a main memory 304 (e.g., read-only memory (ROM), flash memory, dynamic random access memory (DRAM) such as synchronous DRAM (SDRAM) or DRAM (RDRAM), etc.), a static memory 306 (e.g., flash memory, static random access memory (SRAM), etc.), and a secondary memory 316 (e.g., a data storage device in the form of a drive unit, which may include fixed or removable computer-readable storage medium), which communicate with each other via a bus 308.

Processing device 302 represents one or more general-purpose processing devices such as a microprocessor, central processing unit, or the like. More particularly, the processing device 302 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 302 may also be one or more special-purpose processing devices such as an application specific integrated circuit (ASIC), a field programmable gate array (FPGA), a digital signal processor (DSP), network processor, or the like. Processing device 302 is configured to execute the CRL deployment system 326 for performing the operations and steps discussed herein.

The computer system 300 may further include a network interface device 322. The computer system 300 also may include a video display unit 310 (e.g., a liquid crystal display (LCD) or a cathode ray tube (CRT)) connected to the computer system through a graphics port and graphics chipset, an alphanumeric input device 312 (e.g., a keyboard), a cursor control device 314 (e.g., a mouse), and a signal generation device 320 (e.g., a speaker).

The secondary memory 316 may include a machine-readable storage medium (or more specifically a computer-readable storage medium) 324 on which is stored one or more sets of instructions (e.g., the CRL deployment system 326) embodying any one or more of the methodologies or functions described herein. The CRL deployment system 326 may also reside, completely or at least partially, within the main memory 304 and/or within the processing device 302 during execution thereof by the computer system 300, the main memory 304 and the processing device 302 also constituting machine-readable storage media. The a CRL deployment system 326 may further be transmitted or received over a network 318 via the network interface device 322.

The computer-readable storage medium 324 may also be used to store the CRL deployment system 326 persistently. While the computer-readable storage medium 324 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The CRL deployment system 326, components and other features described herein (for example in relation to FIG. 1) can be implemented as discrete hardware components or integrated in the functionality of hardware components such as ASICS, FPGAs, DSPs or similar devices. In addition, the CRL deployment system 326 can be implemented as firmware or functional circuitry within hardware devices. Further, the CRL deployment system 326 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "loading," "generating," "determining," "notifying," "storing," "displaying," "presenting," "receiving," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for automatically determining an acceptable size of a certificate revocation list (CRL) for a system based on the capability of the system has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method comprising:
emulating certificate revocation list (CRL) generation by generating, at periodic intervals, a plurality of CRLs in view of test data;
terminating, by a processing device, the generation of the plurality of CRLs in response to evaluating a defined test completion condition;
determining a cumulative number of revoked certificates in view of the plurality of CRLs generated by the processing device; and
determining, in view of a defined ratio of a CRL size and a number of issued certificates, a number of certificates that may be issued by a certificate server.

2. The method of claim 1, wherein the terminating comprises receiving an error message associated with the generating.

3. The method of claim 1, wherein generating the plurality of CRLs comprises:
generating a CRL comprising a record of the revoked certificates since a first periodic interval.

4. The method of claim 3, wherein determining the cumulative number of revoked certificates comprises:
determining a number of revoked certificates listed in the CRL.

5. The method of claim 1, wherein generating the plurality of CRLs comprises:
generating a delta CRL for a periodic interval, the delta CRL comprising a record of the revoked certificates since a preceding periodic interval.

6. The method of claim 5, wherein determining the cumulative number of revoked certificates comprises:
determining a number of the revoked certificates using the delta CRL.

7. The method of claim 1, wherein the processing device executes a certificate authority server.

8. The method of claim 1, wherein the test data comprises at least one of a serial number, a revocation date, a description of a reason for revoking the certificate, or an invalidity period.

9. The method of claim 1, wherein sending the notification comprises:
displaying the cumulative number of revoked certificates via a user interface.

10. The method of claim 1 further comprising:
receiving test parameters; and
loading the test data based on the test parameters.

11. A system comprising:
a memory; and
a processing device operatively coupled to the memory, the processing device to:
emulate certificate revocation list (CRL) generation by generating, at periodic intervals, a plurality of CRLs in view of test data;
terminate the generation of the plurality of CRLs in response to evaluating a defined test completion condition;
determine a cumulative number of revoked certificates in view of the plurality of CRLs generated by the processing device; and
determine, in view of a defined ratio of a CRL size and a number of issued certificates, a number of certificates that may be issued by a certificate server.

12. The system of claim 11, wherein the test data comprises at least one of a serial number, a revocation date, a description of a reason for revoking the certificate, or an invalidity period.

13. The system of claim 11, wherein to send the notification, the processing device is to:
display the cumulative number of revoked certificates via a user interface.

14. The system of claim 11, wherein the processing device is to terminate the generation of the plurality of CRLs responsive to receiving an error message associated with the generating.

15. A non-transitory computer-readable storage medium including instructions to cause a processing device to:
emulate certificate revocation list (CRL) generation by generating, at periodic intervals, a plurality of CRLs in view of test data;

terminate the generation of the plurality of CRLs in response to evaluating a defined test completion condition;

determine a cumulative number of revoked certificates in view of the plurality of CRLs generated by the processing device; and determine, by the processing device, in view of a defined ratio of a CRL size and a number of issued certificates, a number of certificates that may be issued by a certificate server.

16. The non-transitory computer-readable storage medium of claim 15, wherein to terminate the generation, the processing device is to receive an error message associated with the generating.

17. The non-transitory computer-readable storage medium of claim 15, wherein to generate the plurality of CRLs, the processing device is to:

generate a CRL comprising a record of the revoked certificates since a first periodic interval.

18. The non-transitory computer-readable storage medium of claim 17, wherein to determine the cumulative number of revoked certificates, the processing device is to:

determine a number of revoked certificates listed in the CRL.

19. The non-transitory computer-readable storage medium of claim 15, wherein the test data comprises at least one of a serial number, a revocation date, a description of a reason for revoking the certificate, or an invalidity period.

20. The non-transitory computer-readable storage medium of claim 15, wherein to send a notification, the processing device is to:

display the cumulative number of revoked certificates via a user interface.

* * * * *